US011453318B2

(12) United States Patent
Slater

(10) Patent No.: US 11,453,318 B2
(45) Date of Patent: *Sep. 27, 2022

(54) VEHICLE SOFA-BED AND METHOD OF USE

(71) Applicant: Premier Products, Inc., Marlton, NJ (US)

(72) Inventor: David Slater, Elkhart, IN (US)

(73) Assignee: Premiere Products, Inc, Marlton, NJ (US)

( * ) Notice: Subject to any disclaimer, the term of this patent is extended or adjusted under 35 U.S.C. 154(b) by 217 days.

This patent is subject to a terminal disclaimer.

(21) Appl. No.: 16/778,403

(22) Filed: Jan. 31, 2020

(65) Prior Publication Data
US 2020/0164778 A1 May 28, 2020

Related U.S. Application Data

(63) Continuation of application No. 16/115,702, filed on Aug. 29, 2018, now Pat. No. 10,556,524.

(51) Int. Cl.
*B60N 2/34* (2006.01)
*B60N 3/00* (2006.01)
*A47C 17/80* (2006.01)
*A47C 17/04* (2006.01)
(Continued)

(52) U.S. Cl.
CPC ............... *B60N 2/34* (2013.01); *A47C 17/04* (2013.01); *A47C 17/80* (2013.01); *B60N 2/005* (2013.01); *B60N 2/0232* (2013.01); *B60N 2/0292* (2013.01); *B60N 2/345* (2013.01); *B60N 3/008* (2013.01)

(58) Field of Classification Search
CPC .......... B60N 3/008; B60N 2/005; B60N 2/02; B60N 2/0232; B60N 2/0292; B60N 2/34; B60N 2/345; A47C 17/04; A47C 17/16; A47C 17/162; A47C 17/17; A47C 17/175; A47C 17/80
See application file for complete search history.

(56) References Cited

U.S. PATENT DOCUMENTS 1,353,232 A 9/1920 Griffin et al.
1,360,162 A 11/1920 Westrum
(Continued)

FOREIGN PATENT DOCUMENTS

CA 1149555 7/1983

*Primary Examiner* — David R Hare
(74) *Attorney, Agent, or Firm* — Law Office of Mark Brown, LLC; Christopher M. DeBacker

(57) ABSTRACT

An adjustable sofa-bed assembly for use within a vehicle such as a van or RV. The sofa-bed includes a seat portion, a back portion, and either a permanently fixed base or a removable leg portion which allows the legs to be installed into the vehicle prior to installing the seat and back portions to allow for additional elements to be installed beneath the sofa-bed, such as power elements for a powered sofa-bed assembly or for other equipment. The sofa-bed can be transformed from a sofa configuration with an upright back portion to a bed configuration with a laid-flat back portion. When in the bed configuration, the seat portion and back portion are aligned such that there is no gap between the two portions and the two portions lie completely flat, forming a complete bed assembly.

9 Claims, 11 Drawing Sheets

(51) Int. Cl.
*B60N 2/005* (2006.01)
*B60N 2/02* (2006.01)

(56) References Cited

U.S. PATENT DOCUMENTS

| | | | |
|---|---|---|---|
| 1,378,615 A * | 5/1921 | Rehanek | B60N 2/34 5/118 |
| 1,390,177 A * | 9/1921 | Taylor | B60N 2/34 297/357 |
| 1,548,334 A * | 8/1925 | Sebell | B60N 2/34 297/65 |
| 1,640,984 A | 8/1927 | De Petris | |
| 1,644,405 A | 10/1927 | Underwood | |
| 1,725,807 A * | 8/1929 | Leutz | B60N 2/34 297/66 |
| 2,261,519 A * | 11/1941 | Jones | B60N 2/34 297/65 |
| 2,309,735 A | 2/1943 | Koch et al. | |
| 2,576,343 A * | 11/1951 | Hibbard | B60N 2/34 297/65 |
| 2,796,111 A | 6/1957 | Janczyszyn | |
| 3,140,114 A * | 7/1964 | Stephenson | B60N 2/34 5/118 |
| 3,193,324 A | 7/1965 | Stock | |
| 3,230,798 A | 1/1966 | Kubicek et al. | |
| 3,394,417 A * | 7/1968 | O'Link | B63B 29/06 297/65 |
| 3,596,981 A * | 8/1971 | Koziol | A47C 17/16 297/154 |
| 3,887,229 A | 6/1975 | Plume | |
| 3,910,630 A | 10/1975 | Runyon et al. | |
| 4,065,174 A | 12/1977 | Yokohama et al. | |
| 4,186,960 A | 2/1980 | Mizelle | |
| 4,264,103 A * | 4/1981 | Peresada | B60N 2/995 297/423.27 |
| 4,321,716 A * | 3/1982 | Shrock | A47C 17/1756 5/47 |
| 4,512,048 A * | 4/1985 | Isham | A47C 17/80 297/65 |
| 4,543,675 A | 10/1985 | Shrock | |
| D281,379 S | 11/1985 | Isham et al. | |
| 4,563,784 A | 1/1986 | Shrock et al. | |
| 4,625,346 A | 12/1986 | Quackenbush | |
| 4,731,888 A | 3/1988 | Bridges | |
| 4,750,222 A * | 6/1988 | Quakenbush | A47C 17/1756 5/47 |
| 4,756,034 A | 7/1988 | Stewart | |
| 4,932,709 A | 6/1990 | Wainwright | |
| 4,937,900 A | 7/1990 | Bridges | |
| 5,187,820 A * | 2/1993 | Froutzis | A47C 17/1756 5/55.1 |
| 5,231,710 A | 8/1993 | Markel et al. | |
| 5,528,778 A | 6/1996 | Shrock et al. | |
| 5,718,479 A | 2/1998 | Rautenbach | |
| 5,787,522 A * | 8/1998 | Swihart | A47C 17/1655 5/118 |
| 5,860,702 A * | 1/1999 | Pilarczyk | B60N 2/34 297/65 |
| 6,439,636 B1 | 8/2002 | Kuo | |
| 8,984,680 B2 | 3/2015 | Smith et al. | |
| 9,420,894 B2 * | 8/2016 | Thurow | A47C 17/136 |
| 9,629,471 B2 * | 4/2017 | Van Hool | A47C 17/34 |
| 9,738,185 B1 | 8/2017 | Guygaew | |
| 9,888,781 B2 | 2/2018 | Wallis | |
| 10,556,524 B1 * | 2/2020 | Slater | B60N 2/0232 |

\* cited by examiner

VEHICLE SOFA-BED AND METHOD OF USE

CROSS-REFERENCE TO RELATED APPLICATION

This application is a continuation of and claims priority in U.S. patent application Ser. No. 16/115,702 Filed Aug. 29, 2018 which is incorporated herein by reference.

BACKGROUND OF THE INVENTION

1. Field of the Invention

The present invention relates generally to a retractable sofa-bed and method for use thereof, and more specifically to a sofa-bed for mounting into a vehicle, its methods of installation and its methods of use.

2. Description of the Related Art

Luxury vans and recreational vehicles are often outfitted with sofas which can be transferred into beds for sleeping while traveling. Unfortunately, these sofas are rarely the most comfortable place to sleep in when converted into the bed. The conventional sofa-bed leaves a gap between the seat cushion and the back cushion when converted into the bed, and they produce a subtle "v" shape, not lying entirely flat. What is needed is an improved sofa-bed assembly for vehicles which removes the gap between the cushions and provides a completely lay-flat orientation in bed form.

Heretofore there has not been available a system or method for a sofa-bed for vehicles with the advantages and features of the present invention.

BRIEF SUMMARY OF THE INVENTION

The present invention generally provides an adjustable sofa-bed assembly for use within a vehicle. The sofa-bed includes a seat portion, a back portion, and a base. The base may be permanently mounted to the vehicle or may include a removable leg portion which allows the legs to be installed into the vehicle prior to installing the seat and back portions to allow for additional elements to be installed beneath the sofa-bed, such as power elements for a powered sofa-bed assembly or for other equipment.

The sofa-bed can be transformed from a sofa configuration with an upright back portion to a bed configuration with a laid-flat back portion. When in the bed configuration, the seat portion and back portion are aligned such that there is no gap between the two portions and the two portions lie completely flat, forming a complete bed assembly.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Sofa-Bed Assembly 2

Figure 1:
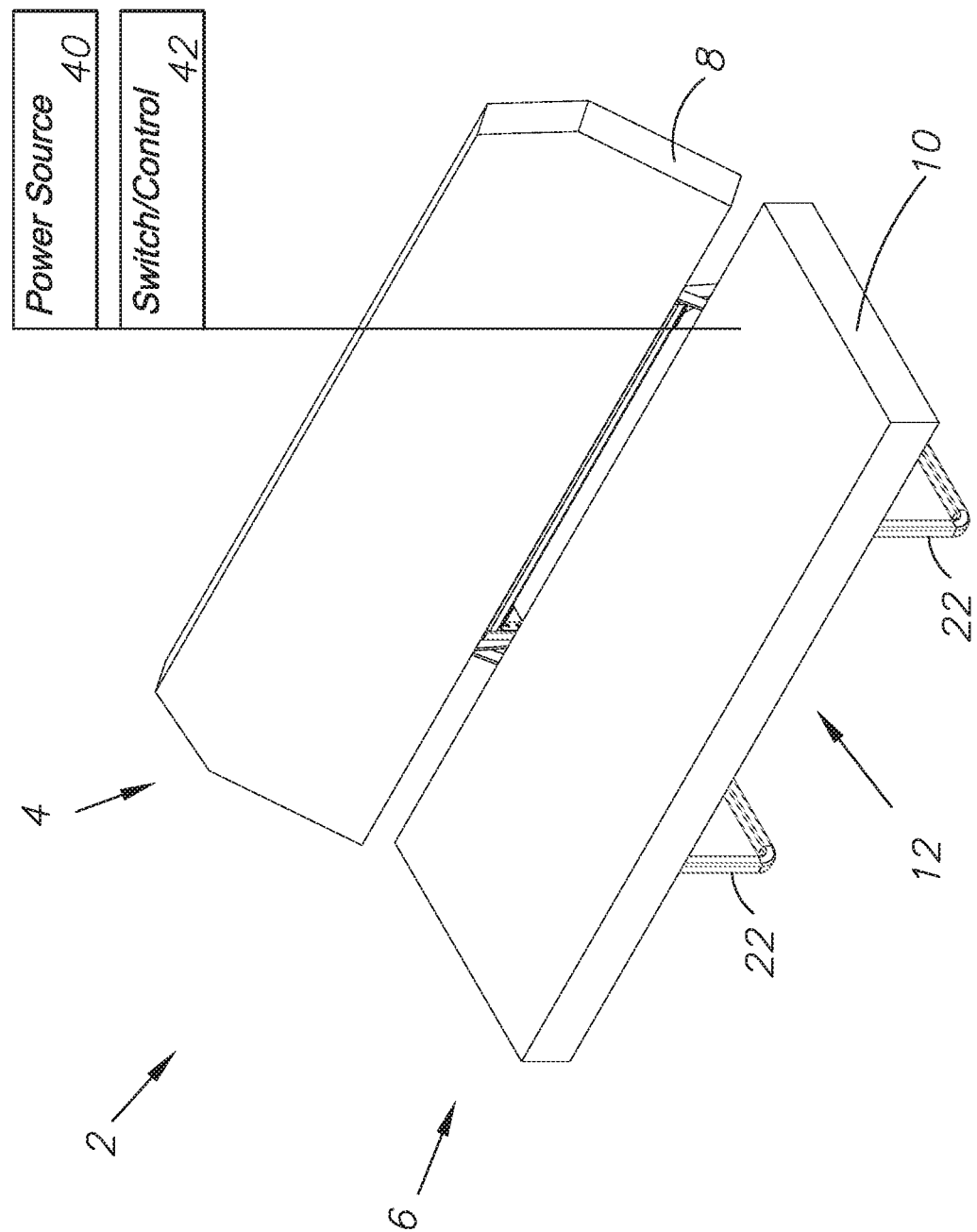
FIG. 1 is three-dimensional isometric view of a preferred embodiment sofa-bed assembly in a first, sofa configuration.
Figure 2:
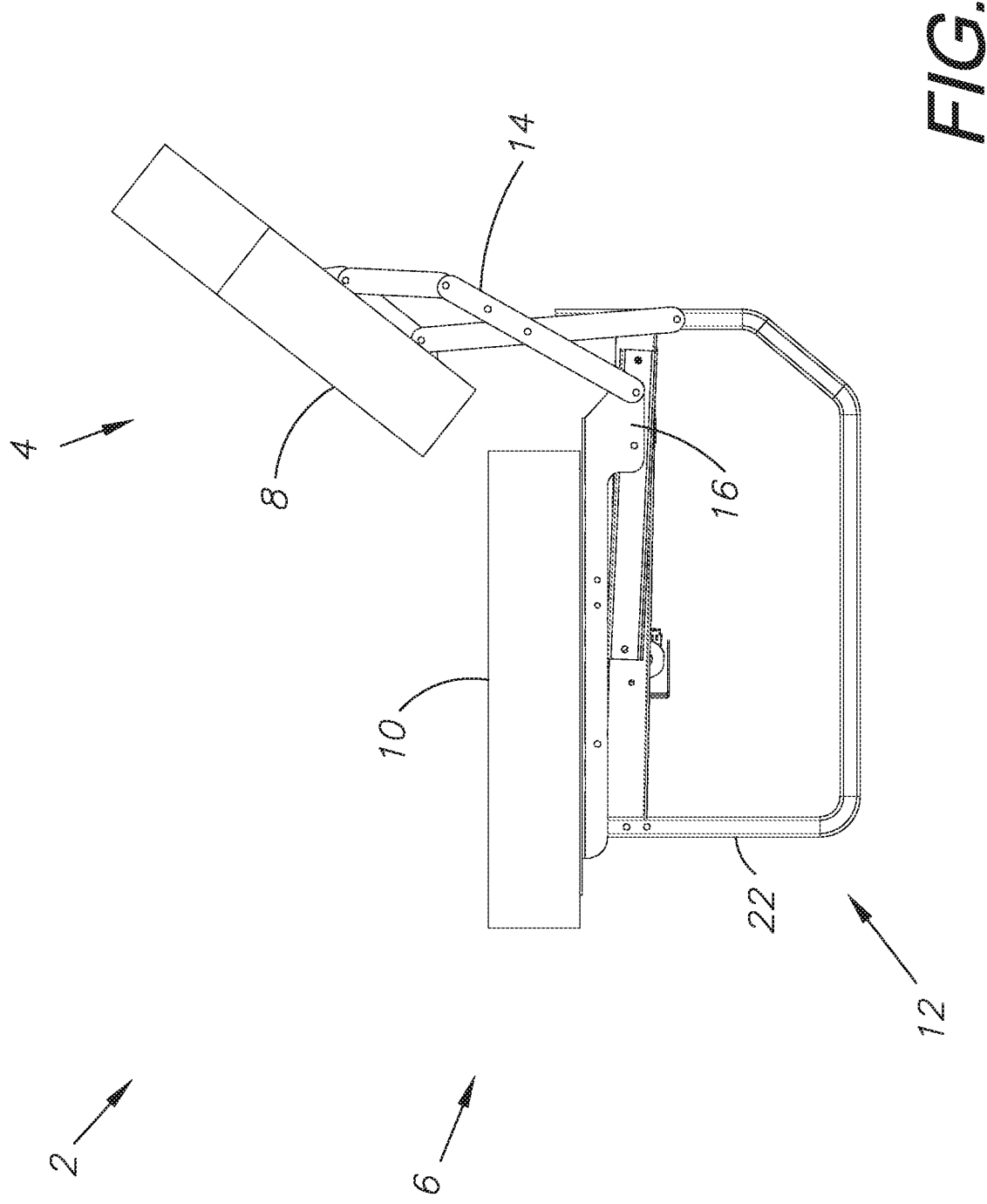
FIG. 2 is a side elevational view thereof.
Figure 3:
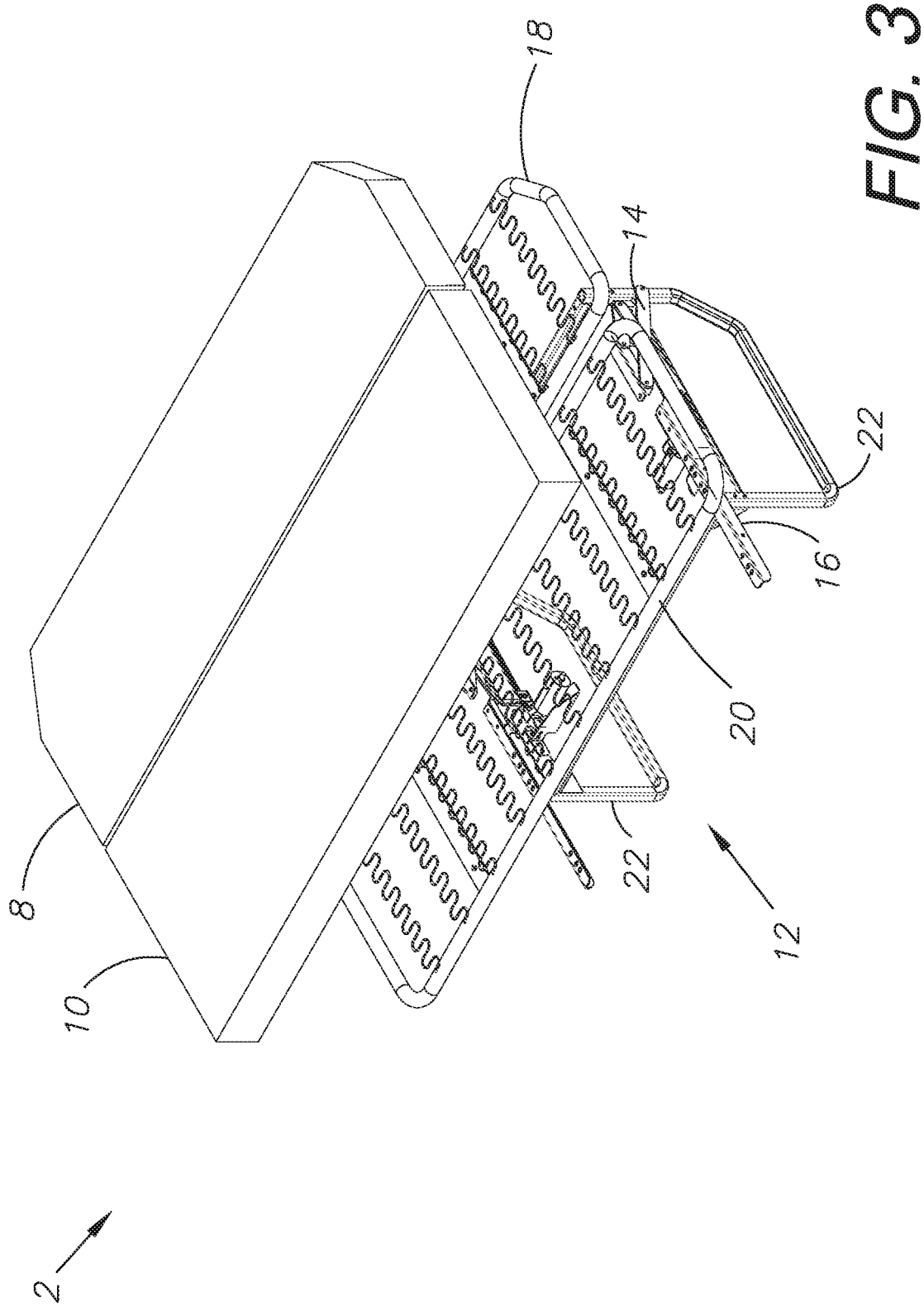
FIG. 3 is a partially-exploded three-dimensional isometric view thereof shown in a second, bed configuration.

As shown in the figures, the present invention provides a sofa-bed assembly 2 which can be transformed from a sofa-configuration as shown in FIG. 1 to a bed-configuration as shown in FIG. 3. The sofa-bed assembly 2 generally includes a rear portion 4, a seat portion 6, and a leg assembly 12. The leg assembly 12 allows for the legs 22 to be bolted to the floor of the vehicle, while the rear 4 and seat 6 portions are removed, to allow for additional elements to be installed or stored beneath the sofa-bed assembly and then the rear 4 and seat 6 portions reinstalled. The legs 22 may also mount to the wheel well assembly of the vehicle. The leg assembly 12 could also be replaced with a static base element which is permanently affixed to the seat portion 6 and rear portion 4.

The rear portion 8 connects to the leg assembly 12 via a pair of scissor arms 14 which allow the rear portion to be transformed from an upright sofa configuration to a laid-flat bed configuration. Similarly, the seat portion 6 is mounted to a slide 16 which allows the seat portion to slide forward as the rear portion is dropped down into the bed configuration.

Figure 4:
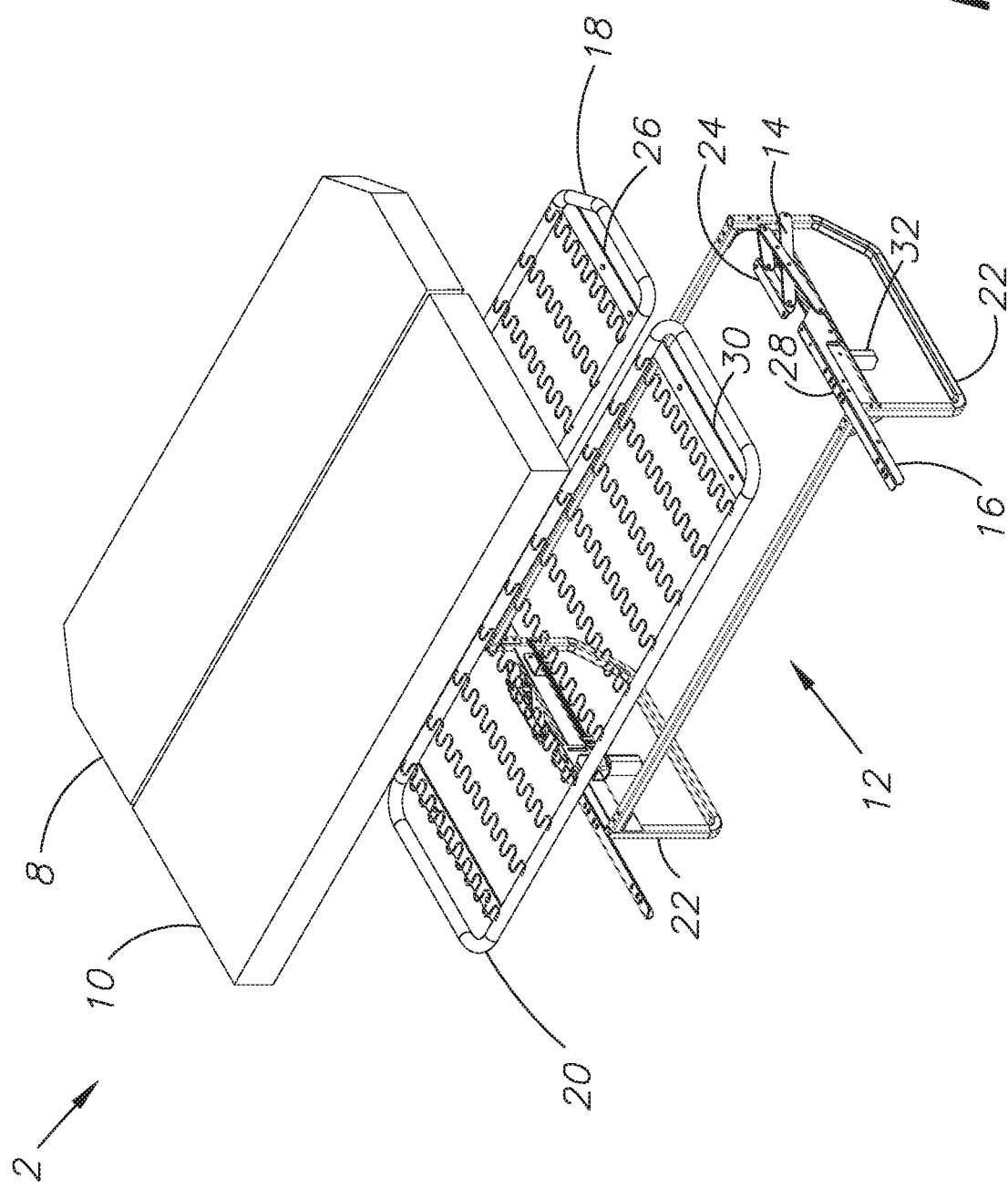
FIG. 4 is an additional exploded three-dimensional isometric view thereof.
Figure 5:
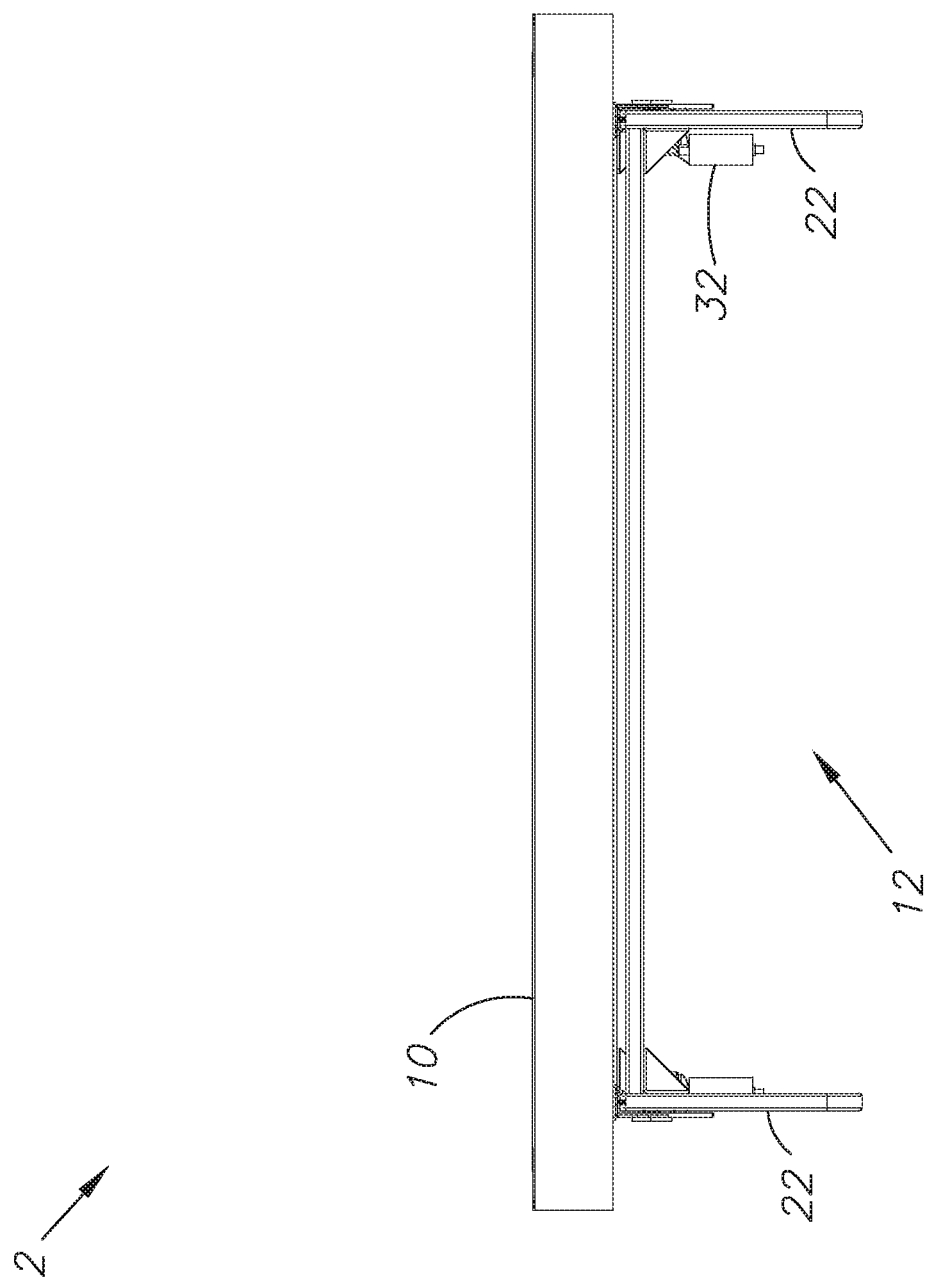
FIG. 5 is a front elevational view of the bed configuration thereof.

FIGS. 3 and 4 show how a seat support structure 20 and rear support structure 18 are placed between the seat cushion 10 and rear cushion 8, respectfully, and the leg assembly 12. A receiver plate 26 on the rear support structure 18 is connected to a receiver plate 24 on the scissor arms 14. Similarly, a receiver plate 30 of the seat support structure 20 is connected to a receiver plate 28 on the top of the slide 16.

Figure 6:
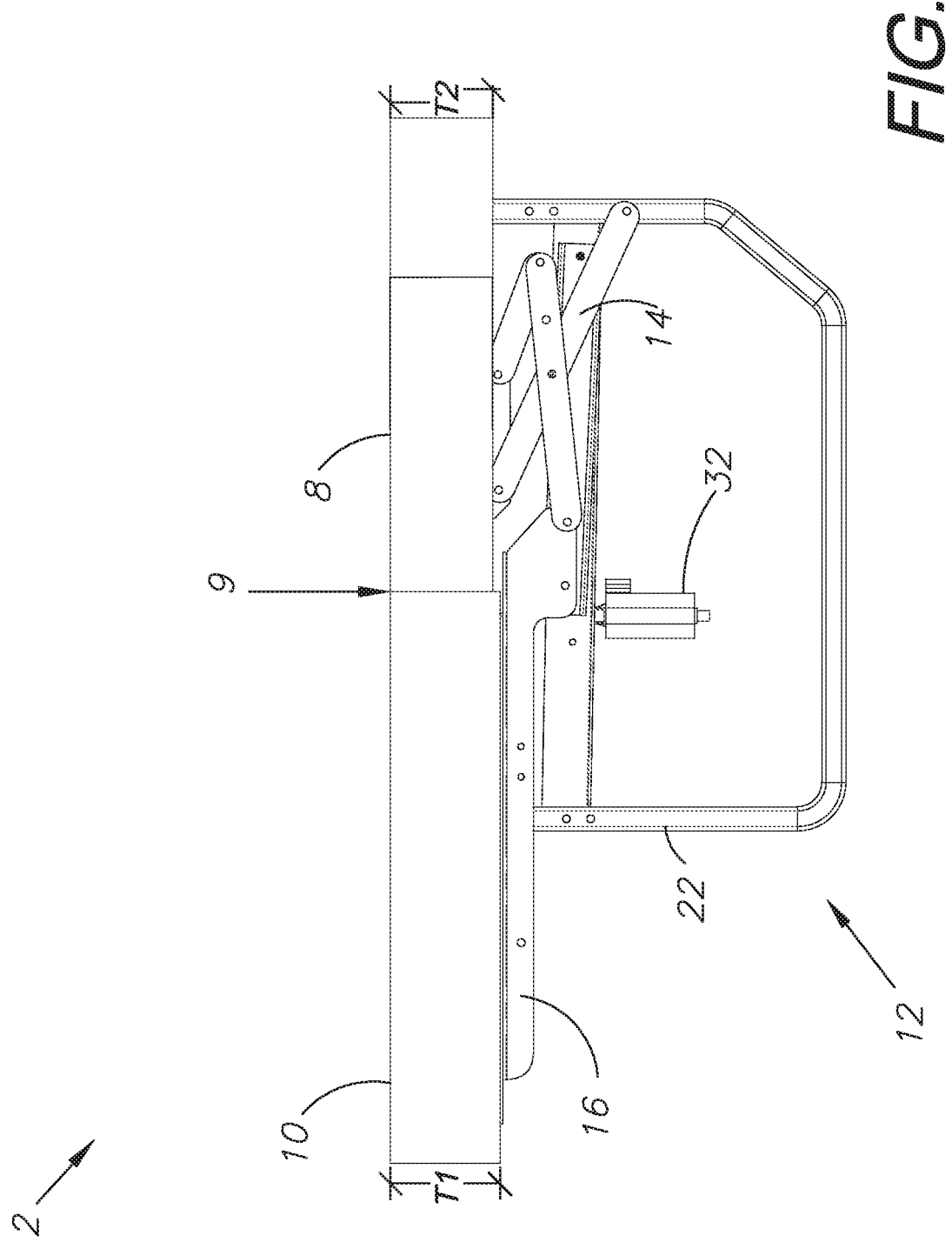
FIG. 6 is a side elevational view thereof.
Figure 7:
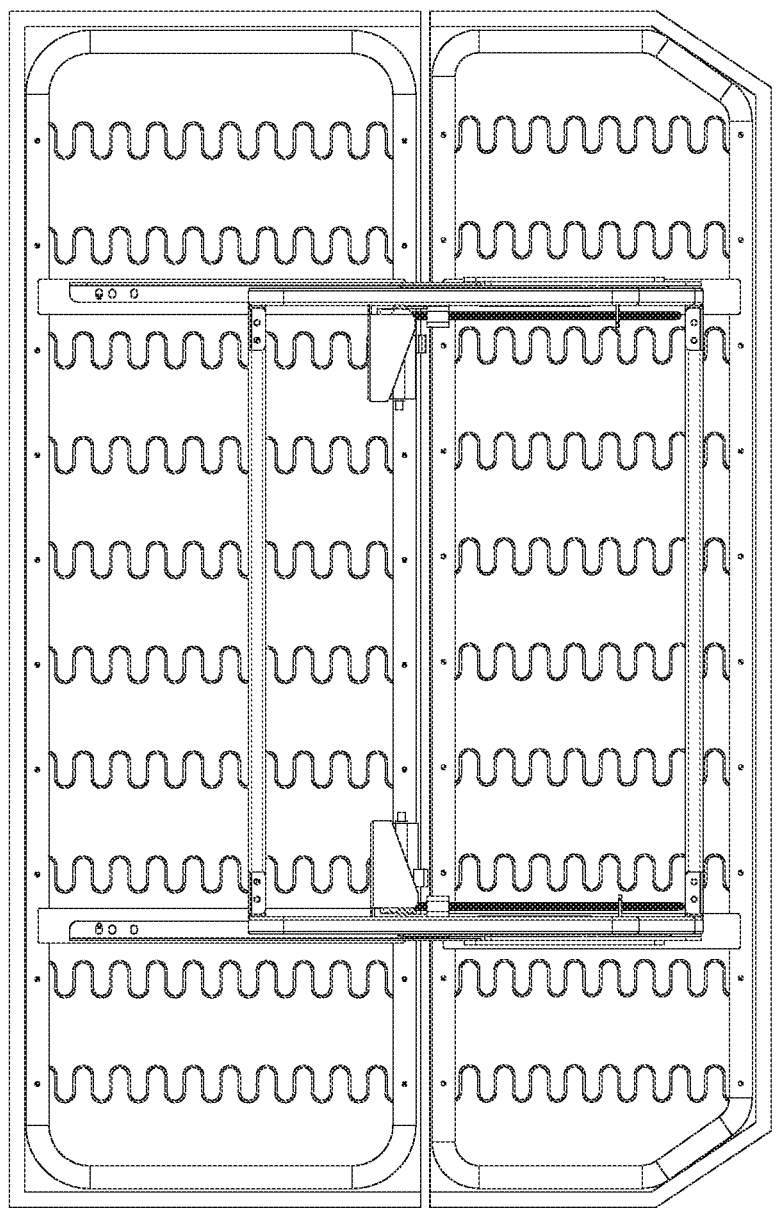
FIG. 7 is a bottom plan view thereof.

FIG. 6 shows how when the rear portion 4 is folded down and the seat portion 6 is slid forward on the slide 16, the two form a flat surface with little to no gap between the cushions 8, 10, as indicated in FIG. 6 by element 9. The seat cushion 10 is of thickness T1, whereas the rear cushion 8 is of thickness T2 to account for the location of the cushions when in the bed configuration. The scissor arms 14 are placed high enough on the frame such that mechanically it is still able to move the rear portion 4 back into its upright orientation. Because the scissor arm must mechanically be placed in such an orientation, the two cushions must be of different thicknesses to facilitate the lay-flat orientation in the laid-flat bed configuration.

In an alternative construction, the two cushions 8, 10 could be of the same thickness, with a thicker base element placed underneath of the seat cushion 10 to raise it to a flush orientation with the rear cushion 8 when in a laid-flat orientation.

Figure 9:
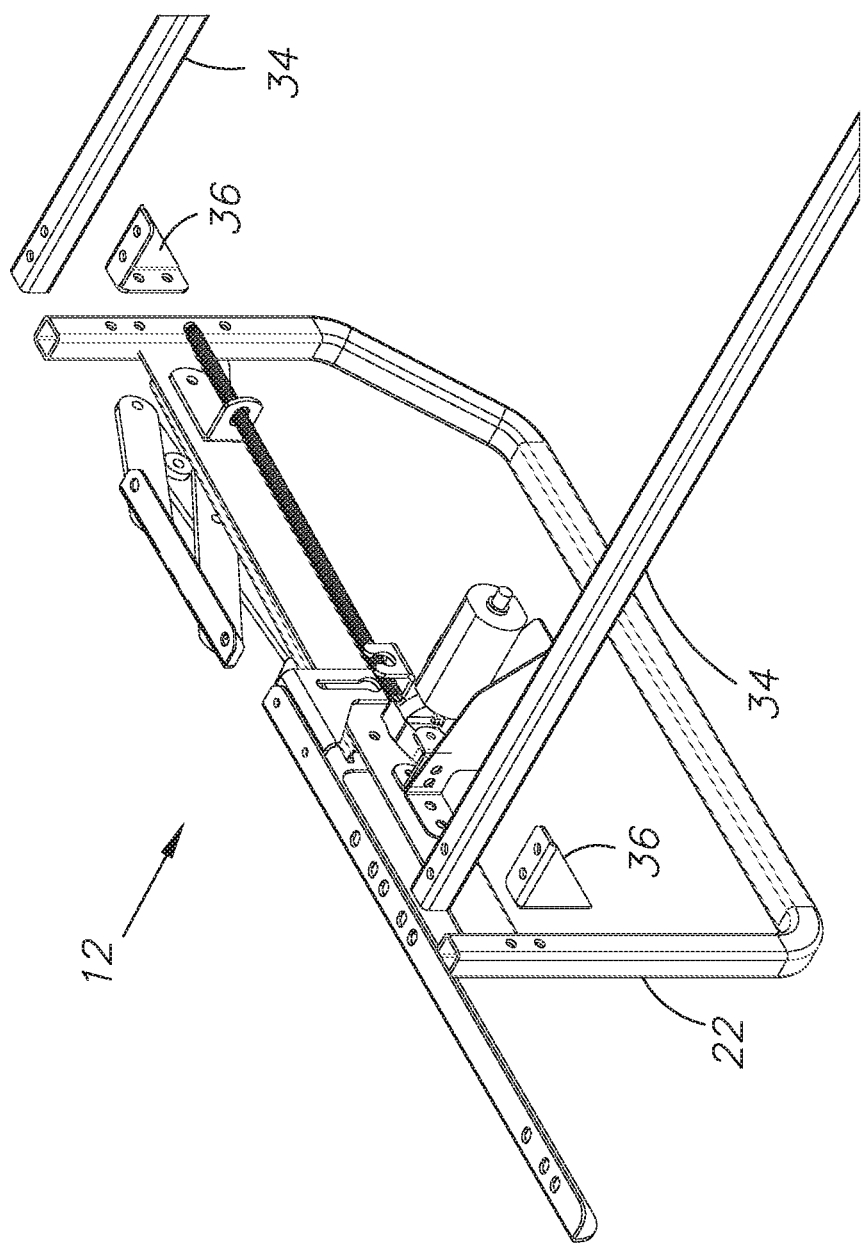
FIG. 9 is a detailed, partially-exploded isometric view thereof.

FIG. 9 shows how the legs 22 are connected to the rest of the leg assembly 12 by connecting cross bars 34 to the legs 22 using corner brackets 36.

Figure 8:
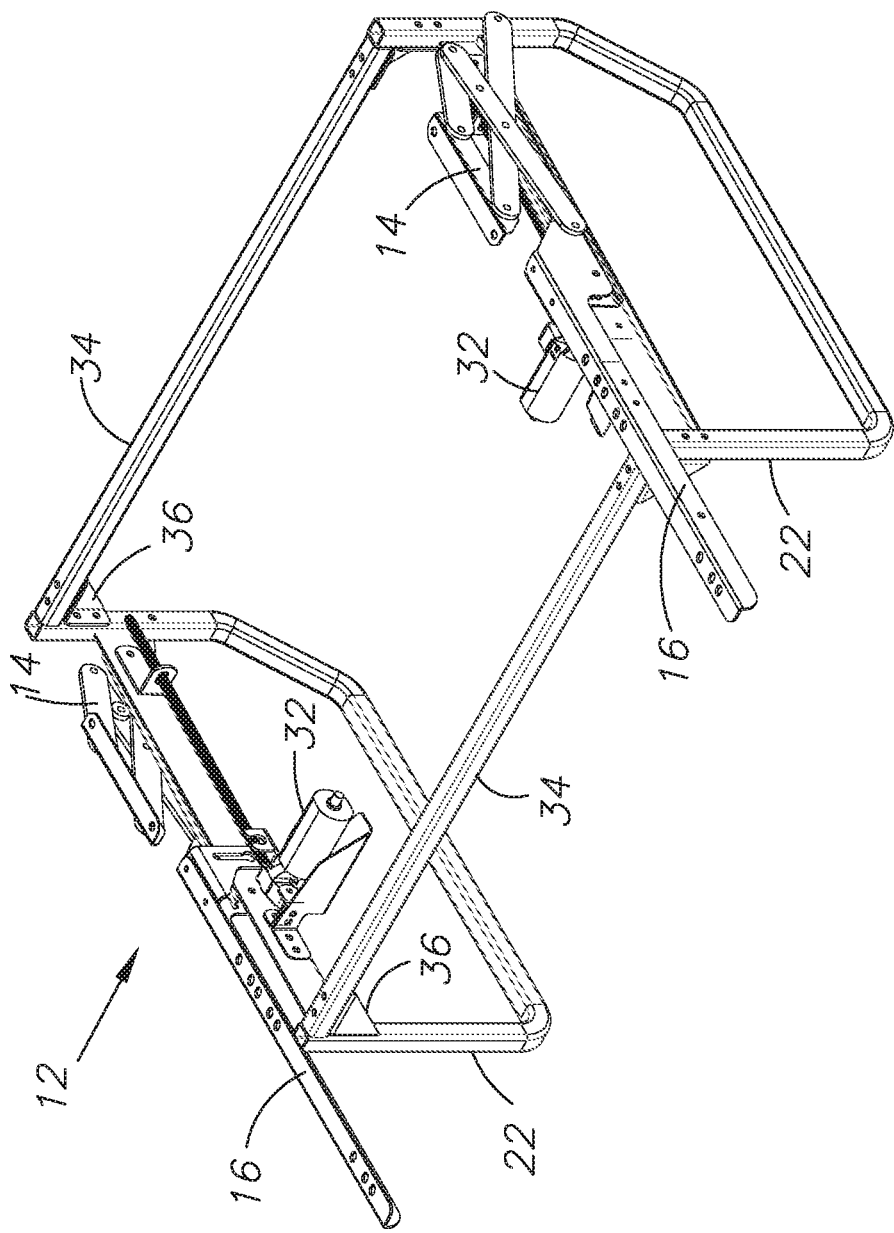
FIG. 8 is a three-dimensional isometric view of a leg assembly element thereof.

The entire sofa-bed assembly 2 could be transformed from the first, sofa configuration to the second, bed configuration using manual controls or via a powered control. The sofa-bed could be connected to the power of the vehicle and a switch or other controls could be used to mechanically transform the sofa-bed between configurations. The motor 32 shown in the figures in a first orientation, such as in FIG. 6, and a second orientation, such as in FIG. 8, controls the physical movement of the sofa-bed when transforming between configurations. A power source 40 which is activated by a switch or control 42 would signal the motor to move the pieces of the sofa-bed assembly 2. The motor 32 could be placed in any orientation to allow for installation of elements beneath the sofa-bed assembly 2.

The leg assembly 12 is completely adjustable to be installed within a vehicle. The height and width of the leg assembly 12 can be adjusted as needed to accommodate the vehicle and/or the bed. When being installed into the vehicle, the frame can be adjusted to fit the width and height needed for the vehicle and to accept sofa bed assemblies of various sizes. FIG. 9 shows how the cross bars 34 and legs 22 can be removed. These elements can either be replaced with longer or shorter elements to adjust the size of the leg assembly 12, or they could be slidably adjustable with locking elements to allow for customizable lengths as desired.

III. Vehicle Seating System 102

Figure 10:
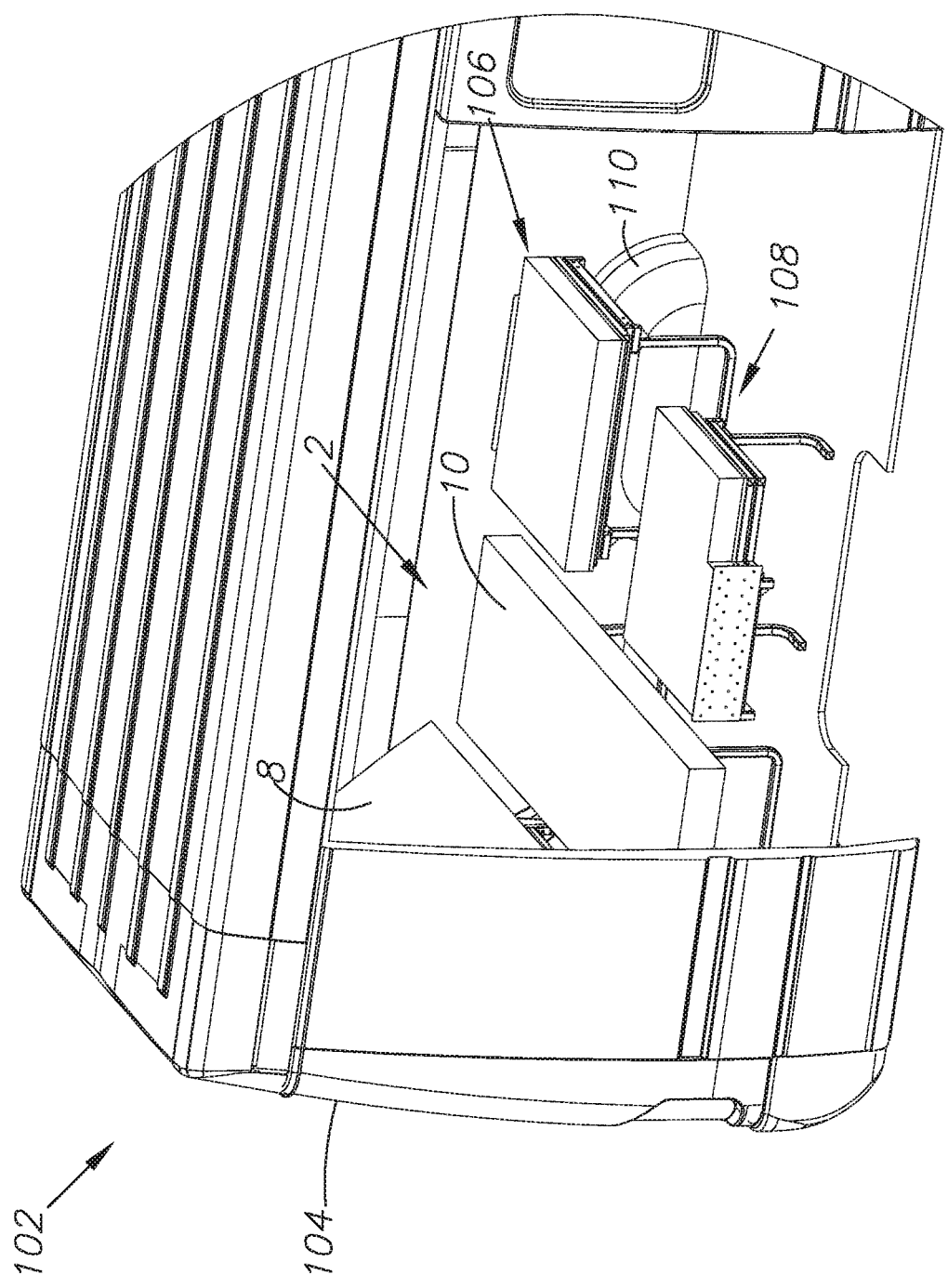
FIG. 10 is a three-dimensional view of a system incorporating the preferred embodiment of the present invention shown in combination with a side-facing sliding seat assemblies installed within a van.
Figure 11:
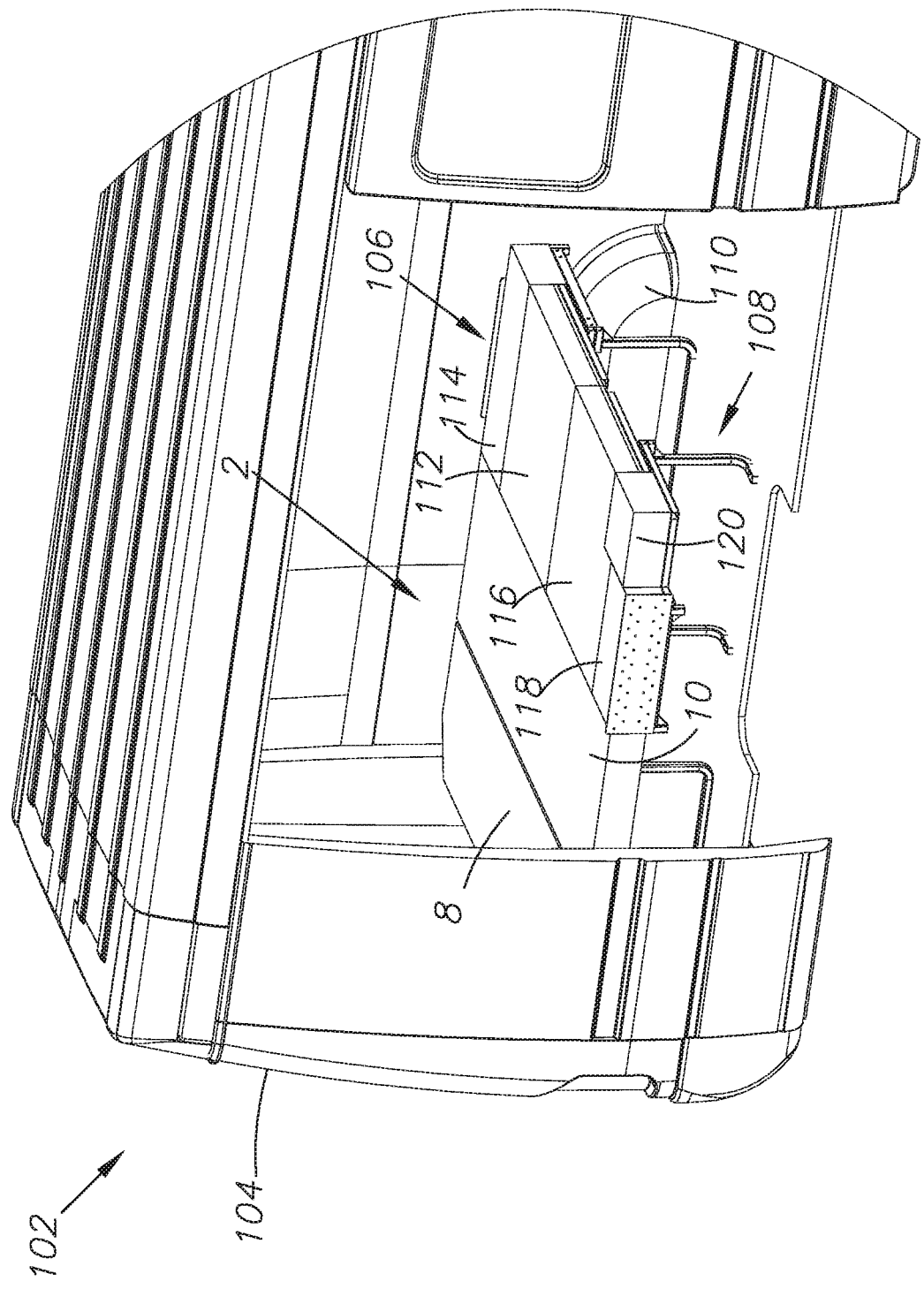
FIG. 11 is a three-dimensional view thereof shown in an extended and flattened orientation.

FIGS. 10-11 show a vehicle seating system 102 installed within a van 104 or RV, which includes the sofa-bed assembly 2 discussed above in combination with a pair of side-facing sliding seats 106, 108. As shown in FIG. 11, when the sofa-bed assembly is transformed into its laid-flat orientation with the rear 8 and seat 10 cushions forming a completely flush laying surface, the sliding seats 106, 108 are also extended to create an even larger sleeping surface.

The sliding seats 106, 108 include sliding cushions 112, 116 which extend outward from the first, seating orientation. A number of modular cushions 114, 118, and 120 may then be inserted behind the sliding cushions 112, 116 to fill in the gaps left by the sliding cushions to create a completely flush, extended sleeping surface in combination with the sofa-bed assembly 2. The sliding seats 106, 108 may be installed over the wheel wells 110 of the vehicle 104, or may be installed on the top of cabinets or other structures within the vehicle. The sliding seats 106, 108 as shown correspondent to a driver's side side-facing sliding seat 106 and a passenger's side side-facing sliding seat 108 which differ slightly in form because the vehicle shown as an example in FIGS. 10-11 requires sliding seats of slightly different shape. However, both sliding seats could be identically shaped.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A sofa-bed assembly for a vehicle, the sofa-bed assembly comprising:
   a base assembly affixed to a support structure;
   said support structure connected to a sofa cushion and a rear cushion;
   said sofa-bed assembly transformable between a first, sofa configuration and a second, bed configuration, wherein when in said second, bed configuration said sofa cushion and said rear cushion a placed adjacent to each other and are in a laid-flat configuration; and
   said support structure comprising a sofa-seat support structure configured to support said sofa cushion, and a rear-seat support structure configured to support said rear cushion;
   said sofa-seat support structure connected to a slide element of a leg assembly;
   said rear-seat support structure connected to a scissor-arm element of said leg assembly;
   said leg assembly affixed to said support structure and to an interior space of the vehicle;
   said leg assembly comprising an adjustable cross bar and a pair of adjustable uprights; and
   wherein said adjustable cross bar and said pair of adjustable uprights are configured to be freely adjustable to alter a height and a width of said leg assembly.

2. The sofa-bed assembly of claim 1, further comprising:
   said leg assembly being removably affixed to said support structure and to said interior space of the vehicle.

3. The sofa-bed assembly of claim 1, further comprising:
   said scissor arm assembly comprising a top plate affixed to a bottom face of said rear-seat support structure; and
   said scissor arm assembly top plate located at a vertical height relative to said sofa-seat support structure such that said top place is above said sofa-seat support structure when said sofa-bed assembly is in said second, bed configuration.

4. The sofa-bed assembly of claim 3, further comprising:
   said sofa cushion comprising a thickness of T1;
   said rear cushion comprising a thickness of T2;
   said thickness T1 being greater than thickness T2 such that a top face of said sofa cushion and a top face of said rear cushion form a level, flat, and aligned surface when said sofa-bed assembly is in said second, bed configuration; and
   wherein said sofa cushion and said rear cushion are immediately adjacent to one another in said second, bed configuration.

5. The sofa-bed assembly of claim 3, further comprising:
   a motor affixed to said support structure;
   said motor configured to activate said scissor arm, thereby sliding said slide element; and
   said motor further configured to automatically transform said sofa-bed assembly between said first, sofa configuration and said second, bed configuration.

6. A method of deploying transformable furniture within a vehicle, the method comprising the steps:
   installing a sofa-bed assembly within a vehicle, said sofa-bed assembly comprising a base assembly affixed to a support structure, said support structure supporting a sofa cushion and a rear cushion;

transforming said sofa-bed assembly from a first, sofa configuration to a second, bed configuration;

whereby said sofa cushion of said sofa-bed assembly rests adjacent to said cushion of said first side-facing sliding seat assembly and said cushion of said second side-facing sliding seat assembly, thereby forming a flat, congruous surface;

activating a scissor arm assembly connected to said rear cushion, said scissor arm configured to raise and lower said rear cushion;

wherein said scissor arm assembly comprising a top plate affixed to a bottom face of said rear-seat support structure;

wherein said scissor arm assembly top plate is located at a vertical height relative to said sofa-seat support structure such that said top place is above said sofa-seat support structure when said sofa-bed assembly is in said second, bed configuration;

wherein said sofa-bed base assembly comprising a removable leg assembly, said removably leg assembly removably affixed to said support structure; and further comprising the steps:

adjusting a length of a crossbar of said removable leg assembly, thereby adjusting a width of said adjustable leg assembly; and adjusting a height of a pair of upright members of said removably leg assembly, thereby adjusting a height of said adjustable leg assembly.

7. The method of claim 6, wherein:

said sofa cushion comprising a thickness of T1;

said rear cushion comprising a thickness of T2;

said thickness T1 being greater than thickness T2 such that a top face of said sofa cushion and a top face of said rear cushion form a level, flat, and aligned surface when said sofa-bed assembly is in said second, bed configuration; and wherein said sofa cushion and said rear cushion are immediately adjacent to one another in said second, bed configuration.

8. The method of claim 6, further comprising the steps:

installing said removable leg assembly into said vehicle prior to installing said support structure to said removable leg assembly; and placing an object into a space formed by said removable leg assembly prior to installing said support structure.

9. The method of claim 6, further comprising the steps:

installing a first side-facing sliding seat assembly within a vehicle, said first side-facing sliding seat assembly comprising a moveable seat cushion;

installing a second side-facing sliding seat assembly, said second side-facing sliding seat assembly comprising a moveable seat cushion;

transforming said first side-facing sliding seat assembly from a first, seat configuration to a second, extended configuration;

transforming said second side-facing sliding seat assembly from a first, seat configuration to a second, extended configuration;

whereby said cushion of said first side-facing sliding seat assembly is placed into contact with and rests adjacent to said cushion of said second side-facing sliding seat assembly; and whereby said sofa cushion of said sofa-bed assembly is placed into contact with and rests adjacent to said cushion of said first side-facing sliding seat assembly and said cushion of said second side-facing sliding seat assembly, thereby forming a flat, congruous surface between said sofa cushion, said rear cushion, said first side-facing sliding seat assembly cushion, and said second side-facing sliding seat assembly cushion.

* * * * *